(12) United States Patent
Saddoughi

(10) Patent No.: US 6,722,581 B2
(45) Date of Patent: Apr. 20, 2004

(54) SYNTHETIC JET ACTUATORS

(75) Inventor: Seyed G. Saddoughi, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 10/003,540

(22) Filed: Oct. 24, 2001

(65) Prior Publication Data

US 2003/0075615 A1 Apr. 24, 2003

(51) Int. Cl.$^7$ ................................................. B05B 3/04
(52) U.S. Cl. ................ 239/102.2; 239/509; 239/102.1; 239/510; 239/521; 239/524
(58) Field of Search ........................... 239/102.1, 102.2, 239/509, 510, 511, 512, 521, 524

(56) References Cited

U.S. PATENT DOCUMENTS

| | | | |
|---|---|---|---|
| 4,363,991 A | 12/1982 | Edelman | 310/316 |
| 5,758,823 A | 6/1998 | Glezer et al. | 239/4 |
| 5,957,413 A | 9/1999 | Glezer et al. | 244/208 |
| 6,056,204 A | 5/2000 | Glezer et al. | 239/8 |
| 6,109,566 A | 8/2000 | Miller et al. | 244/207 |
| 6,123,145 A | 9/2000 | Glezer et al. | 165/104.33 |
| 6,394,363 B1 * | 5/2002 | Arnott et al. | 239/102.1 |
| 6,405,934 B1 * | 6/2002 | Hess et al. | 239/102.2 |
| 6,460,778 B1 * | 10/2002 | Silverbrook | 239/102.1 |
| 2001/0022024 A1 * | 9/2001 | Takeuchi et al. | 239/102.2 |

FOREIGN PATENT DOCUMENTS

JP    05185032 A   *   7/1993   ............. B06B/1/04

OTHER PUBLICATIONS

Seyed G. Saddoughi et al., *Investigations of "On–Demand" Vortex Generators*. Center for Turbulence Research, Stanford University, Stanford, CA, USA (Sep. 1998). pp. 1–8, Figures 1–10.

Seyed G. Saddoughi, *Experimental investigations of "on–demand" vortex generators*, Annual Research Briefs 1994, Center for Turbulence Research, Stanford University, Stanford, CA, USA. Entire document.

S.A. Jacobsen and W.C. Reynolds, *An Experimental Investigation Towards the Active Control of Turbulent Boundary Layers*. Stanford University, Stanford, CA, USA (Mar. 1995). pp. 152, 219–234.

Seyed G. Saddoughi, *Preliminary results of the "on–demand" vortex–generator experiments*, Annual Research Briefs 1995, Center for Turbulence Research, Stanford University, Stanford, CA, USA. Entire document.

* cited by examiner

Primary Examiner—Robin O. Evans
(74) Attorney, Agent, or Firm—Pierce Atwood

(57) ABSTRACT

A first embodiment of the present invention provides a vortex generator in the form of a flexible piezoelectric actuator blade disposed in a wall of a flowpath, such as an airfoil. Another embodiment provides a synthetic jet actuator in which a pair of bimorph piezoelectric plates are connected by a flexible hinge.

16 Claims, 7 Drawing Sheets

SYNTHETIC JET ACTUATORS

BACKGROUND OF THE INVENTION

This invention relates generally to synthetic jet actuators and more particularly to synthetic jet actuators operated by piezoelectric actuators.

It is known to use a synthetic jet to influence the flow over a surface, for example to control flow separation from an airfoil. A typical synthetic jet actuator comprises a housing defining an internal chamber. An orifice is present in a wall of the housing. The actuator further includes a mechanism in or about the housing for periodically changing the volume within the internal chamber so that a series of fluid vortices are generated and projected in an external environment out from the orifice of the housing. Various volume changing mechanisms are known, for example a piston positioned in the jet housing to move so that fluid is moved in and out of the orifice during reciprocation of the piston, or a flexible diaphragm as a wall of the housing. The flexible diaphragm is typically actuated by a piezoelectric actuator or other appropriate means.

Typically, a control system is utilized to create time-harmonic motion of the diaphragm. As the diaphragm moves into the chamber, decreasing the chamber volume, fluid is ejected from the chamber through the orifice. As the fluid passes through the orifice, the flow separates at the sharp edges of the orifice and creates vortex sheets which roll up into vortices. These vortices move away from the edges of the orifice under their own self-induced velocity. As the diaphragm moves outward with respect to the chamber, increasing the chamber volume, ambient fluid is drawn from large distances from the orifice into the chamber. Since the vortices are already removed from the edges of the orifice, they are not affected by the ambient fluid being entrained into the chamber. As the vortices travel away from the orifice, they synthesize a jet of fluid, a "synthetic jet," through entrainment of the ambient fluid.

However, the prior art devices have relatively limited capacity, in that they use only a single moving element or a moving element of limited deflection. It would be desirable to obtain increased performance of synthetic jet actuators.

Accordingly, there is a need for a synthetic jet actuator having greater capacity than previous devices.

BRIEF SUMMARY OF THE INVENTION

The above-mentioned need is met by the present invention, a first embodiment of which provides a synthetic jet actuator in the form of a flexible piezoelectric actuator blade disposed in a wall of a flowpath, such as an airfoil. In another embodiment, a synthetic jet actuator is provided in which a pair of bimorph piezoelectric plates are connected by a flexible hinge.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 10b illustrates a bottom view of the orifice plate of FIG. 10a.

DETAILED DESCRIPTION OF THE INVENTION

Figure 1:
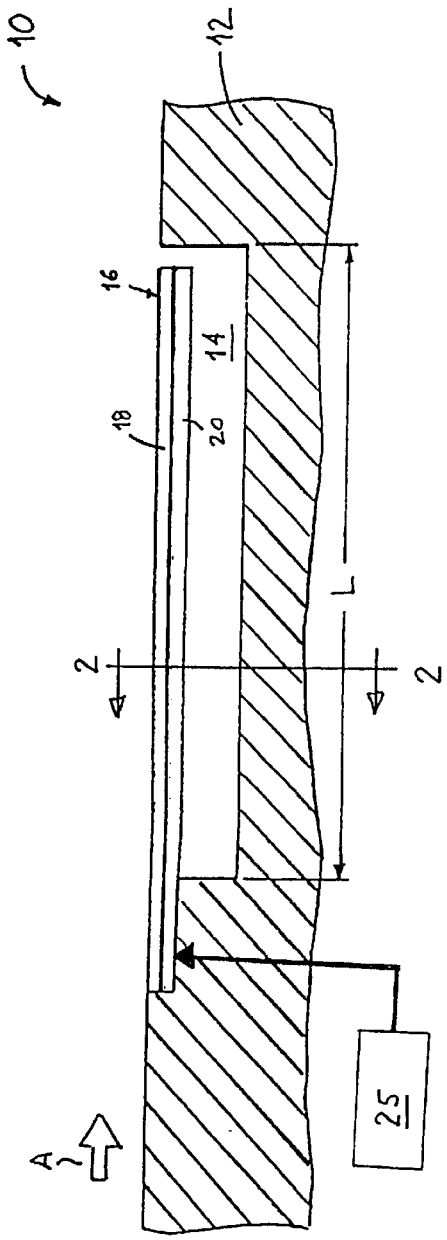
FIG. 1 illustrates a schematic sectional side view of a first embodiment of the present invention.
Figure 2:
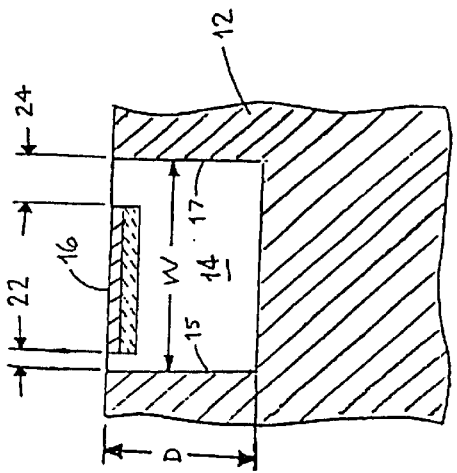
FIG. 2 illustrates a cross-sectional view taken along lines 2—2 of FIG. 1.

Referring to the drawings wherein identical reference numerals denote the same elements throughout the various views, FIG. 1 shows a vortex generator 10. The vortex generator is disposed in a wall 12 which has a flow over its surface in the direction of arrow A. The flow could also be in the direction opposite to arrow A, as described in more detail below. The wall 12 could be any structure bounding a fluid flow to be modified, such as an airfoil or the wall of an enclosed flow path such as a diffuser. A generally rectangular cavity 14 having a depth D, width W, and length L is formed in the wall 12. The cavity 14 has a pair of space-apart generally parallel sides 15 and 17. The open side of the cavity 14 is covered by a flexible, generally rectangular actuator blade 16. The blade 16 is attached to the wall 12 by a cantilever support at the upstream end of the cavity 14 with respect to the direction of flow. The blade 16 could also be attached to the wall 12 at the downstream end with respect to the direction of flow. The blade 16 may be attached to the wall 12 by any known means, for example with an adhesive or fasteners. The blade 16 itself is formed in two layers. A flexible layer 18 is formed from a flexible material, such as stainless steel or aluminum. A piezoelectric layer 20 is attached to the flexible layer 18 and is formed from a piezoelectric material, for example piezoceramic. The piezoelectric layer 20 could be disposed closest to the fluid flow or could be opposite from it. Although the illustrated example shows a single piezoelectric layer 20, it is also possible to attach a second layer piezoelectric layer 20 to the opposite side of the blade 16, so that the flexible layer 18 would have a piezoelectric layer 20 on each side, which would increase the output of the vortex generator 10. The layers 18 and 20 are securely bonded to each other, for example by the use of an adhesive layer, for example glue having a thickness of about 0.025 mm (0.001 in.). The width of the blade 16 is less than the width W of the cavity 14, and the length of the portion of the blade 16 extending over the cavity 14 is slightly less than that of the cavity 14 to provide an operating clearance. The length L of the cavity 14 (and thus the length of the blade 16) may be varied, for example L could be as short as about 6.35 mm (0.25 in.), although the shorter the device becomes, the smaller the tip deflection of the blade 16 (and thus the lower the effectiveness of the vortex generator 10). The length L could be as large as about 40.6 cm (16 in.). At lengths greater than about 40.6 cm (16 in.), the vortex generator 10 tends to become unreliable. In one embodiment the length L may be about 10 inches. This is significantly larger than similar devices have been made in the past. The blade 16 is installed in an off-center position relative to the cavity 14 such that two unequal side gaps 22 and 24 are created between the edges of the blade 16 and the sides 15, 17 of the cavity 14. The side gap 22 may range from about 0.2 mm (0.008 in.) to about 0.25 mm (0.01 in.), whereas side gap 24 may range from about 1.0 mm (0.04 in.) to about 3.0 mm (0.12 in). In a preferred arrangement, side gap 22 is about 0.2 mm (0.008 in.) and side gap 24 is about 2.5 mm (0.1 in.). The blade 16 is also connected to a controllable electric source 25 (depicted schematically in FIG. 1) so that an alternating voltage of the desired magnitude and frequency may be applied to the blade 16.

In operation, an alternating voltage is applied to the blade 16 from the controllable source. When a potential is applied across the piezoelectric layer 20, the layer 20 either expands or contracts depending upon the polarity of the voltage. Since the piezoelectric layer 20 is bonded to the metal layer 18, The application of the alternating voltage induces a bending strain and a "springboard" oscillation of the blade 16. In one example, a blade 16 approximately 25.4 cm (10 in.) long, 25.4 mm (1 in.) wide, and 3.43 mm (0.135 in.) thick, having a flexible layer 18 of stainless steel 3.18 mm (0.125 in.) thick was constructed. When a 75 Hz, 200V RMS sinusoidal input signal was applied, the peak-to-peak tip deflection at the unattached end of the blade 16 was approximately 1.27 mm (0.5 in.). This tip deflection is somewhat greater than prior art devices and increases the capacity of the vortex generator 10. Furthermore, the use of a piezoceramic actuator has advantages over other known types of actuators, such as mechanical actuators, particularly in that it may be reliably operated at higher frequencies, for example about 70–80 Hz, which further increases the effectiveness of the vortex generator 10. A mechanically actuated device has problems operating at these frequencies because it tends to distort the blade into a sinusoidal mode shape, which interferes with the creation of the desired vortex patterns. The piezoelectrically actuated blade 16 of this invention does not experience this problem.

Figure 3:
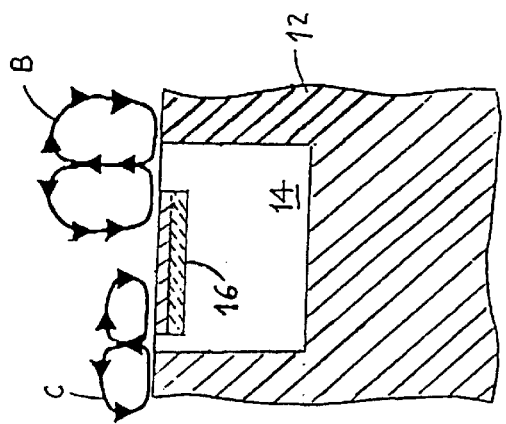
FIG. 3 illustrates a cross-sectional view similar to that of FIG. 2.

In operation, as the blade 16 moves outward with respect to the cavity 14, increasing the cavity volume, ambient fluid is drawn from large distances from the large side gap 24 into the cavity 14. On the subsequent downstroke the blade 16 moves downward into the cavity 14, decreasing the cavity volume and expelling fluid from the cavity through the large side gap 24. As shown in FIG. 3, this alternating "pull" and "push" of the blade 16 results in a vortex flow pattern above the large side gap 24, illustrated by arrow B. A similar flow pattern, to a lesser degree, is created above the narrow side gap 22, illustrated by arrow C. The larger side gap 24 forms the primary passage for fluid into and out of the cavity 14, while the narrow side gap 22 primarily creates a space for operating clearance of the blade 16 as it oscillates. In the case where the flow over the surface of the wall 12 is opposite to the direction of arrow A, there is an additional benefit in that when the vortex generator blade is extended outward, it acts as a conventional vortex generator protruding from the surface, helping to prevent flow separation.

Figure 4:
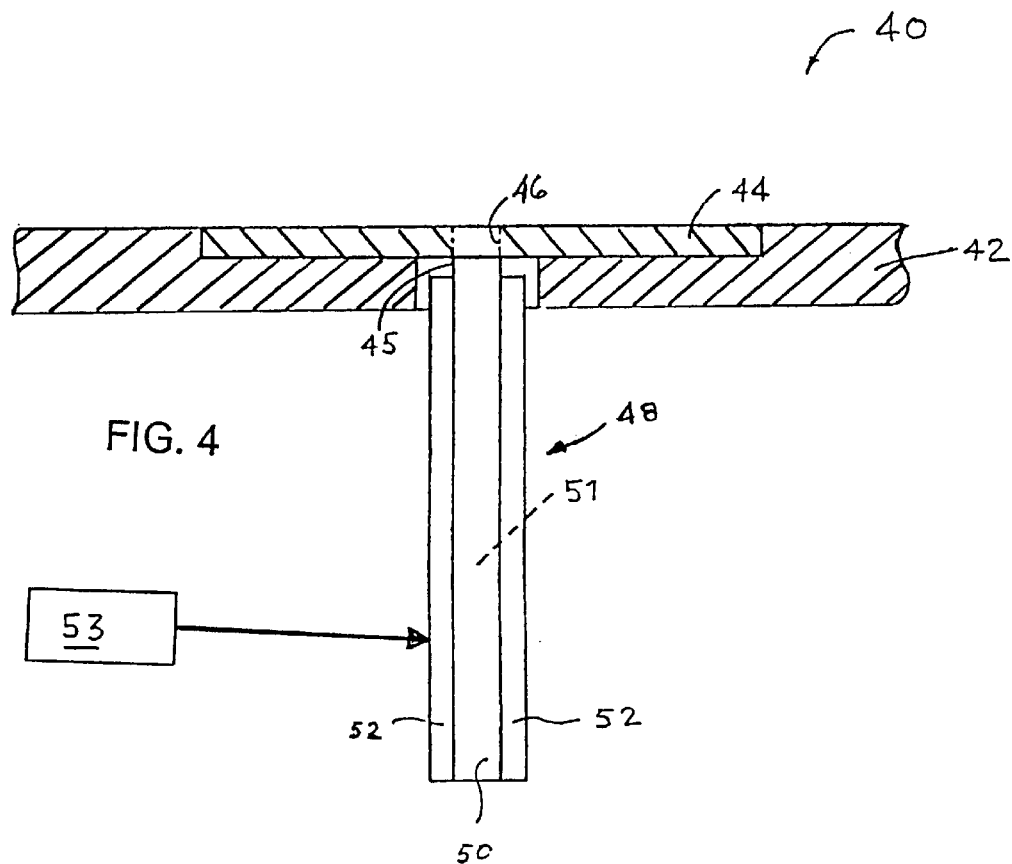
FIG. 4 illustrates a schematic sectional side view of a second embodiment of the present invention.
Figure 9:
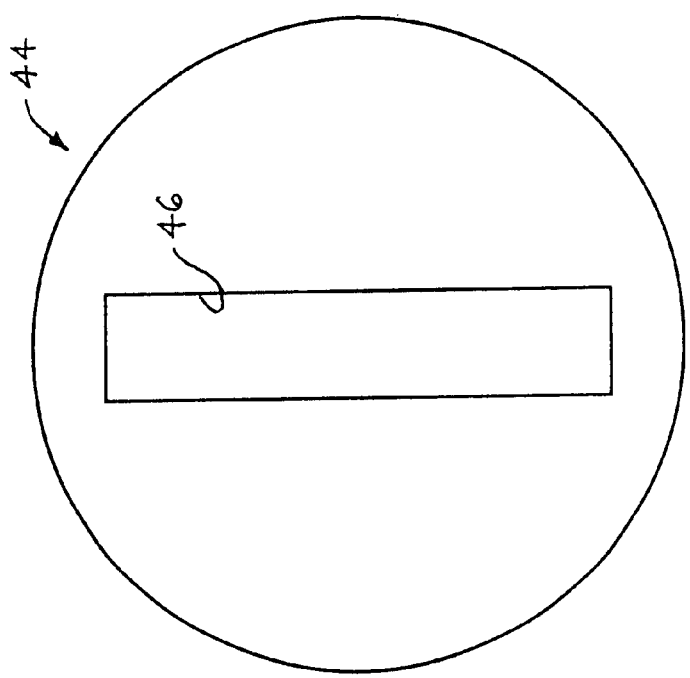
FIG. 9 illustrates a second variation of an orifice plate for use with the present invention.
Figure 8:
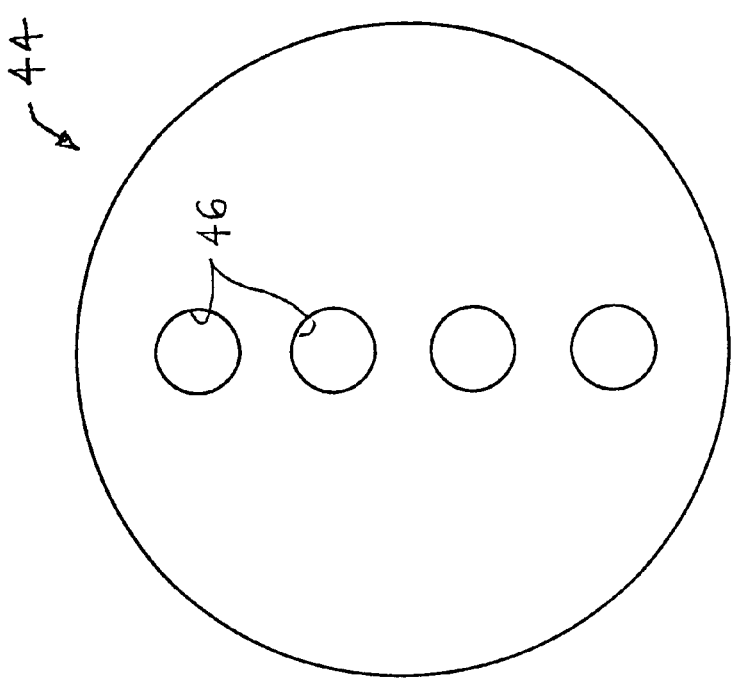
FIG. 8 illustrates a first variation of an orifice plate for use with the present invention.
Figure 10A:
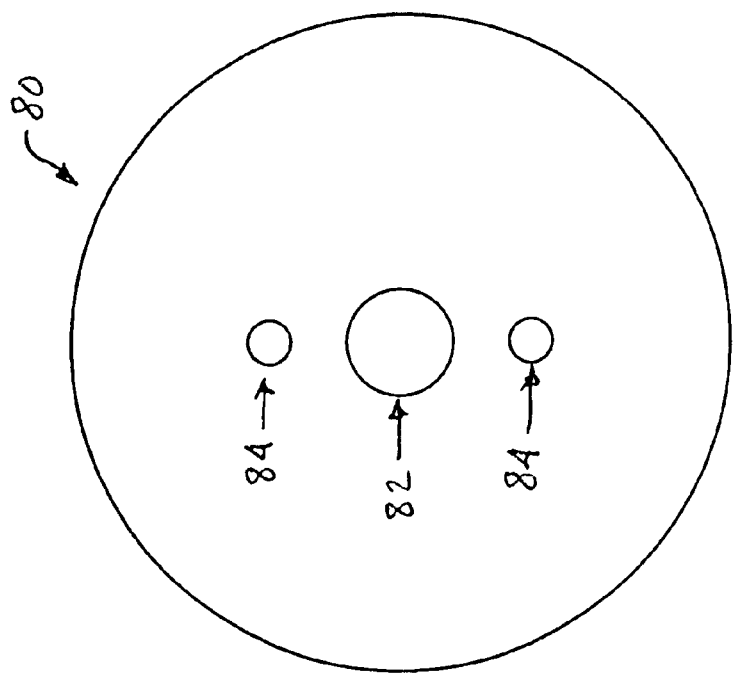
FIG. 10a illustrates a top view of a third variation of an orifice plate for use with the present invention.
Figure 10B:
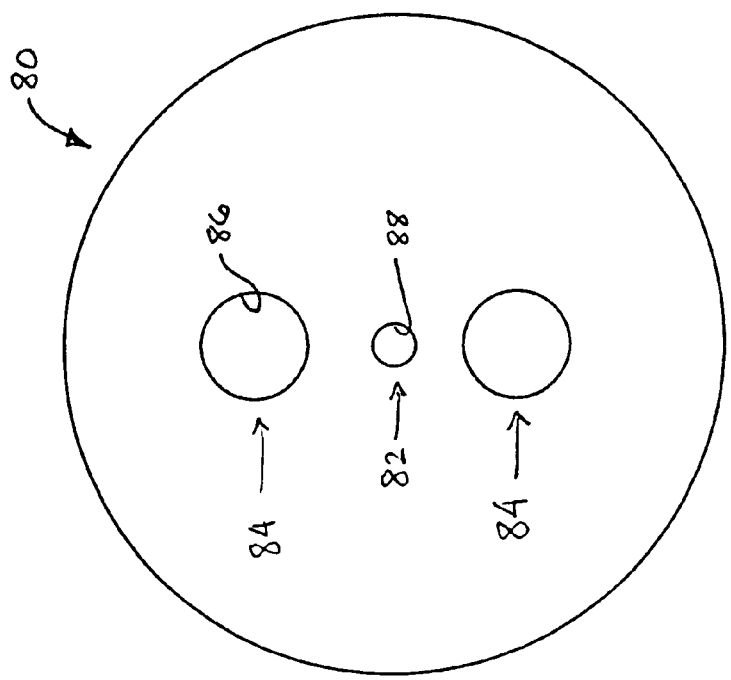

Another embodiment of the invention is shown in FIG. 4. A synthetic jet actuator 40 is disposed in a wall 42. An orifice plate 44 is disposed in the fluid flow side of the wall 42. A vortex generator body 48 is attached to the orifice plate 44 by a discharge conduit 45, which is an extension of a flexible hinge 50, described below. The interior of the vortex generator body communicates with the fluid flow side of the wall 42 through one or more orifices 46 in the orifice plate 44. The orifices 46 may be a series of holes as shown in FIG. 8, or may take the form of an elongated slot, as shown in FIG. 9. The size, shape, number and angle of the orifices 46 may be modified in order to suit a particular application, for example the orifices 46 may be angled in a downstream direction (pitch angle), or the array of orifices 46 may be angled in the plane of the orifice plate 44 (yaw angle). One possible arrangement of an orifice plate 80 is illustrated in FIGS. 10*a* and 10*b*. FIG. 10*b* illustrates the side facing the external flow, while FIG. 10*a* illustrates the side of the orifice plate 80 facing a fluid cavity 51 of the vortex generator body 48. An orifice plate 80 has a central hole 82 and side holes 84 disposed on either side of the central hole 82. Each of the holes has a conical or nozzle-like profile, so that the hole inlet 86 is larger in diameter than the hole outlet 88. The central hole 82 is disposed so that the inlet 86 is on the side of the orifice plate 80 facing the fluid cavity 51 of the vortex generator body 48, while the two side holes 84 face the opposite direction. Since the holes have a lower resistance to flow in the direction from the inlet 86 to the outlet 88 than in the opposite direction, this arrangement tends to make air going inward to the fluid cavity 51 flow through the two side holes 84, while flowing outward from the fluid cavity 51 tends to flow though the central hole 82. This increases the velocity of the air flow out of the fluid cavity 51 which increases the effectiveness of the synthetic jet actuator 40.

The vortex generator body 48 is constructed from a pair of side plates 52 which are connected by a flexible hinge 50. The plates 52 are spaced apart from each other and are disposed in a generally parallel relationship. The flexible hinge 50 encircles the space between the plates 52 and may overlap the edges of the plates 52. In the illustrated example the hinge 50 is about 6.35 mm (0.25 in.) wide. The hinge 50 holds the side plates 52 together. The internal fluid cavity 51 is thus enclosed by the side plates 52 and the hinge 50. In the example shown, each side plate 52 is in the shape of a circular disk approximately 76.2 mm (3.0 in.) in diameter, although the diameter may range from about 12.7 mm (0.5 in.) to about 10.2 cm (4.0 inches). The side plates may be of other shapes, for example rectangular. This arrangement is similar to a bellows. The hinge 50 may overlap the edges of the disk for attachment purposes. The hinge 50 itself may be constructed from any flexible, fluid-tight material. In one embodiment, The hinge itself is made of a material that is suitable as an adhesive, for example a room temperature vulcanizing (RTV) material.

Figure 5:
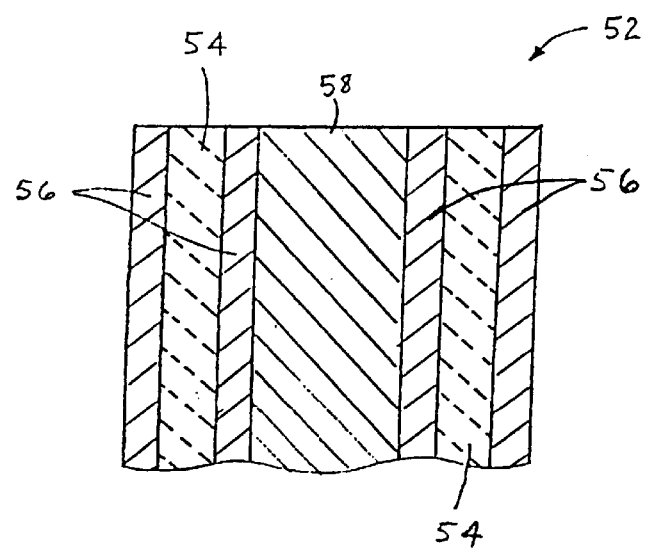
FIG. 5 illustrates a detailed view of one of the side plates of FIG. 4.

FIG. 5 shows the side plates in greater detail. Each side plate is formed from a plurality generally planar stacked layers. Each side plate 52 forms a bimorph piezoelectric structure. That is, each side plate comprises two piezoelectric layers 54 having opposite polarities. The piezoelectric layers 54 are made of a piezoceramic material. In the illustrated example they are approximately 0.191 mm (0.0075 in.) thick. When a voltage is applied to the bimorph, one layer 54 expands while the other layer 54 contracts due to the opposite-facing polarities. Since the piezoelectric layers 54 are parallel to each other, the application of a voltage causes the side plate 52 to take up a roughly hemispherical shape, in the case of circular side plates. When a voltage of opposite polarity is applied, the side plate 52 bends in the opposite direction (i.e. concave instead of convex). This arrangement in effect doubles the force exerted for a given voltage compared to a single piezoelectric layer. The piezoelectric layers 54 are covered on each side with a thin protective cladding layer 56 in order to prevent cracking of the piezoelectric layers 54. In an exemplary embodiment the cladding layers 56 are made of stainless steel, preferably no more than about 0.127 mm (0.005 in.) thick, and are attached to the piezoelectric layers 54 with a suitable adhesive. The piezoelectric layers 54 with the attached cladding layers are attached to opposite sides of a central layer referred to as a shim 58, for example with an adhesive layer, approximately 0.012 mm (0.0005 in.) thick. The shim 58 material and thickness is selected for sufficient stiffness to place the operating frequency of the actuator body 48 in the desired range. In the illustrated example, the shim is made of aluminum and is about 0.51 mm (0.020 in.) thick. The assembled vortex generator body 48 thus comprises two bimorph piezoelectric side plates 52 connected by a flexible hinge 50. The side plates 52 are connected to a controllable electric source 53 (shown schematically in FIG. 4) so that an alternating voltage of the desired magnitude and frequency may be applied to the blade side plates 52.

In operation, voltage from the electric source is applied to the side plates 52 so as to cause the plates to deflect in opposite directions to each other. That is, when the left-hand side plate 52 illustrated in FIG. 4 is deflected convexly to the right, the right-hand side plate 52 is deflected convexly to the left. this simultaneous deflection reduces the volume of the fluid cavity 51 and causes fluid to be expelled through the discharge conduit 45 and then from the orifice 46. When voltage of opposite polarity is applied, the side plates deflect in the opposite direction. This action increases the volume of the fluid cavity 51 and causes a decreased partial pressure in the fluid cavity 51, which in turn causes fluid to enter the fluid cavity 51 through the orifice 46. Since each side plate 52 is a bimorph piezoelectric structure, and there are two side plates, this embodiment of the present invention has four times the capacity of a single piezoelectric device of the same overall dimensions. In one example, a device constructed as described above produced a jet velocity of approximately 85.4 m/s (280 ft/s) when a 750 Hz, 150V RMS input signal was applied.

Figure 11:
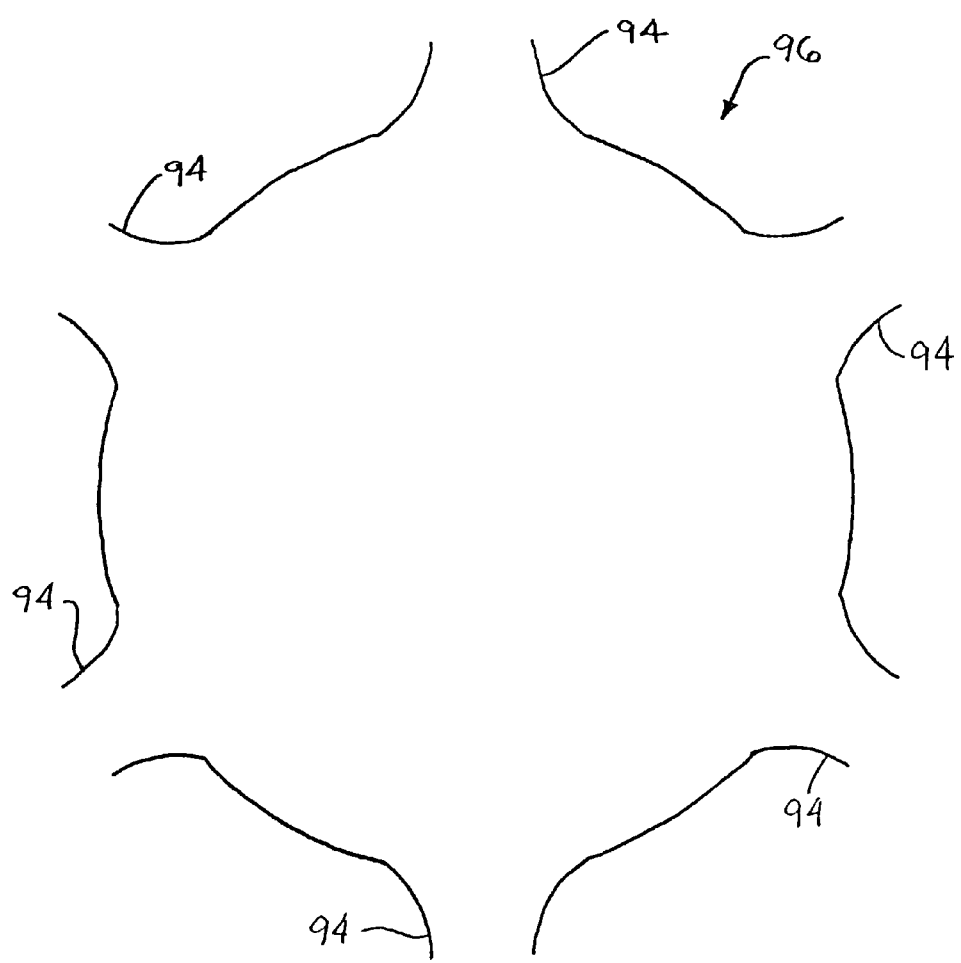
FIG. 11 illustrates a multiple outlet arrangement for use with a second embodiment of the present invention.

As an alternative to the arrangement illustrated in FIG. 4, the vortex generator body 48 may be provided with more than one outlet, for example a plurality of discharge conduits 94 may be arranged around the periphery of a vortex generator body. FIG. 11 depicts how these additional discharge conduits 94 could be incorporated into a flexible hinge 96, which is seen from the side in FIG. 11. The number of discharge conduits 94 is only limited by the physical space available. Although the outlet velocity is reduced by adding additional discharge conduits 94, the outlet velocity is not reduced in proportion to the number of additional discharge conduits 94. For example, testing has shown that a vortex generator body 48 having 6 outlets still produces about 90% of the outlet velocity of the same vortex generator having a single outlet. In other words, this means that a single vortex generator body 48 could be used to produce output for a number of orifices 46.

Figure 6:
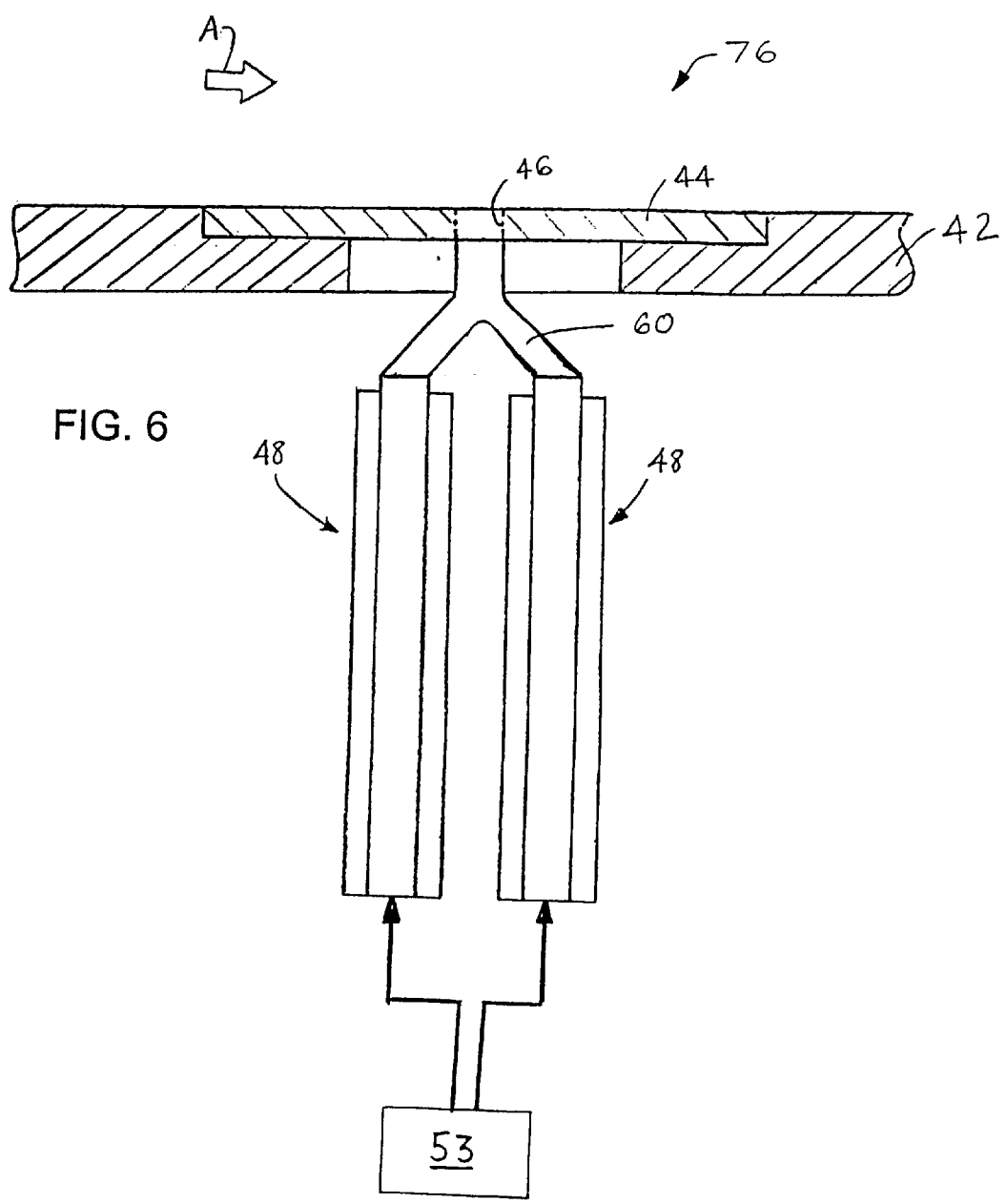
FIG. 6 illustrates a schematic sectional side view of a possible variation of the second embodiment of the present invention.
Figure 7:
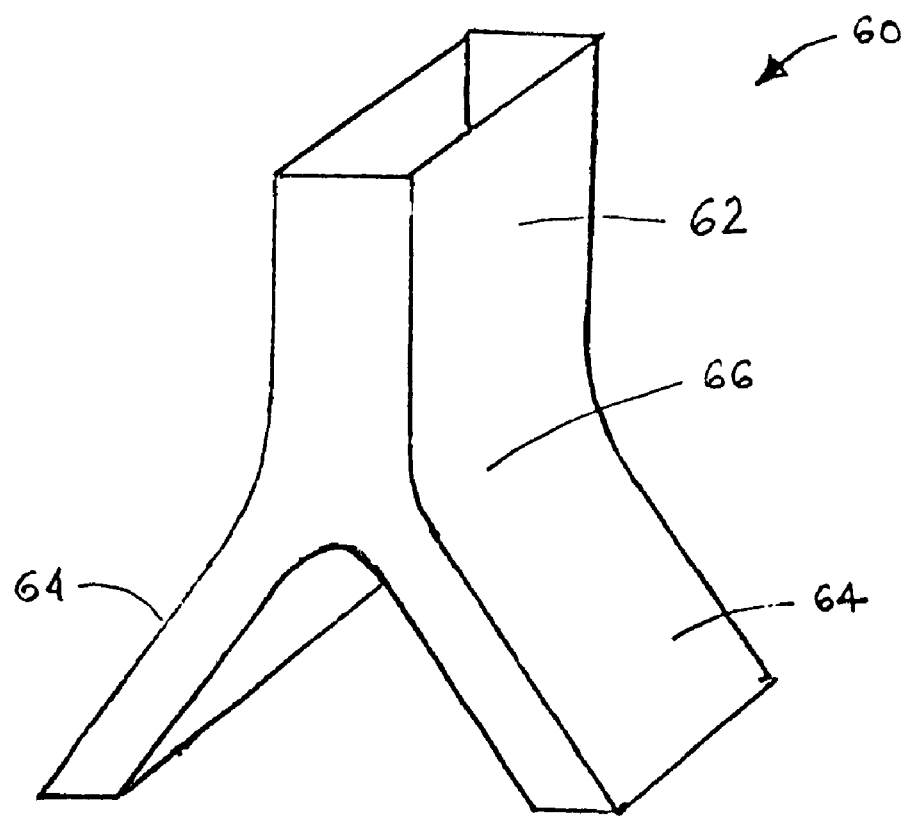
FIG. 7 illustrates a perspective view of a discharge conduit.

The output of two or more of the vortex generator bodies 48 may be combined into a single discharge area. As seen in FIG. 6, a synthetic jet actuator 76 comprises, for example, a pair of vortex generator bodies 48 disposed adjacent a wall 42. A discharge conduit 60 having a generally inverted Y-shape connects the two vortex generator bodies 48. The conduit 60 is shown in more detail in FIG. 7. The conduit 60 is hollow and has an outlet leg 62 connected to two inlet legs 64 at a junction 66. The outlet leg 62 of the conduit 60 communicates with the fluid flow side of the wall 42 through one or more orifices 46 in the orifice plate 44. The orifices 46 may be a series of holes, as shown in FIG. 8, or may take the form of an elongated slot as shown in FIG. 9. The size, shape, number and angle of the orifices 46 may be modified in order to suit a particular application. The orifices 46 may also be arranged in the patter illustrated in FIGS. 10a and 10b, as described in more detail above. The vortex generator bodies 48 are connected to a controllable electric source 53 (shown schematically in FIG. 6). It should be noted that it is possible to use one power source 53 for multiple vortex generator bodies 48 connected in series, as each vortex generator body 48 has a low power consumption. This variation of the invention provides further increased capacity from a single orifice plate.

The foregoing has described synthetic jet actuators of increased capacity. While specific embodiments of the present invention have been described, it will be apparent to those skilled in the art that various modifications thereto can be made without departing from the spirit and scope of the invention as defined in the appended claims.

What is claimed is:

1. A synthetic jet actuator comprising:
   a first vortex generator body having first and second side plates connected by a flexible hinge and defining a first fluid cavity therebetween, wherein each side plate comprises a bimorph piezoelectric structure;
   a first discharge conduit having a first end in fluid communication with said first fluid cavity; and
   means for applying an alternating voltage to said first vortex generator body.

2. The synthetic jet actuator of claim 1 wherein each of said side plates comprises two piezoceramic layers attached to opposite sides of a central shim such that the polarities of said piezoceramic layers are opposed to each other.

3. The synthetic jet actuator of claim 2 wherein each of said piezoceramic layers has a protective cladding layer bonded to each side thereof.

4. The synthetic jet actuator of claim 1 further comprising an orifice plate having at least one orifice therethrough, wherein a second end of said discharge conduit is in fluid communication with said orifice.

5. The synthetic jet actuator of claim 4 wherein said orifice is an elongated slot.

6. The synthetic jet actuator of claim 4 where said orifice is a circular hole.

7. The synthetic jet actuator of claim 4 comprising at least one additional orifice, wherein said additional orifice is a circular hole.

8. The synthetic jet actuator of claim 4 wherein said orifice plate comprises a central hole and at least two side holes, wherein each of said central and said side holes has a cross-sectional area which converges in the direction of flow therethrough, and wherein said central hole is disposed is said orifice plate so that its direction of flow is outward from said fluid cavity and said side holes are disposed in said orifice plate so that their direction of flow is inward to said fluid cavity.

9. The synthetic jet actuator of claim 1 further comprising:
   at least one additional vortex generator body disposed adjacent said first vortex generator body, said additional vortex generator body having first and second side plates connected by a flexible hinge and defining an additional fluid cavity therebetween, wherein each side plate comprises a bimorph piezoelectric structure; and at least one additional discharge conduit having a first end in fluid communication with said additional fluid cavity, wherein a second end of said additional discharge conduit is in fluid communication with a second end of said first discharge conduit.

10. The synthetic jet actuator of claim 1 further comprising at least one additional discharge conduit in fluid communication with said fluid cavity.

11. A synthetic jet actuator comprising:

a first vortex generator body having first and second side plates connected by a flexible hinge and defining a first fluid cavity therebetween, wherein each side plate comprises a bimorph piezoelectric structure;

a second vortex generator body having first and second side plates connected by a flexible hinge and defining a second fluid cavity therebetween, wherein each side plate of said second vortex generator body comprises a bimorph piezoelectric structure;

a discharge conduit having a first inlet leg, a second inlet leg, and an outlet leg, said first inlet leg disposed in fluid communication with said first fluid cavity and said outlet leg, and said second inlet leg disposed in fluid communication with said second fluid cavity and said outlet leg; and means for applying an alternating voltage to said first and second vortex generator bodies.

12. The synthetic jet actuator of claim 11 further comprising an orifice plate having at least one orifice therethrough, wherein said outlet leg is disposed in fluid communication with said orifice.

13. The synthetic jet actuator of claim 12 wherein said orifice is an elongated slot.

14. The synthetic jet actuator of claim 12 where said orifice is a circular hole.

15. The synthetic jet actuator of claim 12 comprising at least one additional orifice, wherein said additional orifice is a circular hole.

16. The synthetic jet actuator of claim 12 wherein said orifice plate comprises a central hole and at least two side holes, wherein each of said central and said side holes has a cross-sectional area which converges in the direction of flow therethrough, and wherein said central hole is disposed is said orifice plate so that its direction of flow is outward from said fluid cavity and said side holes are disposed in said orifice plate so that their direction of flow is inward to said fluid cavity.

* * * * *